United States Patent Office.

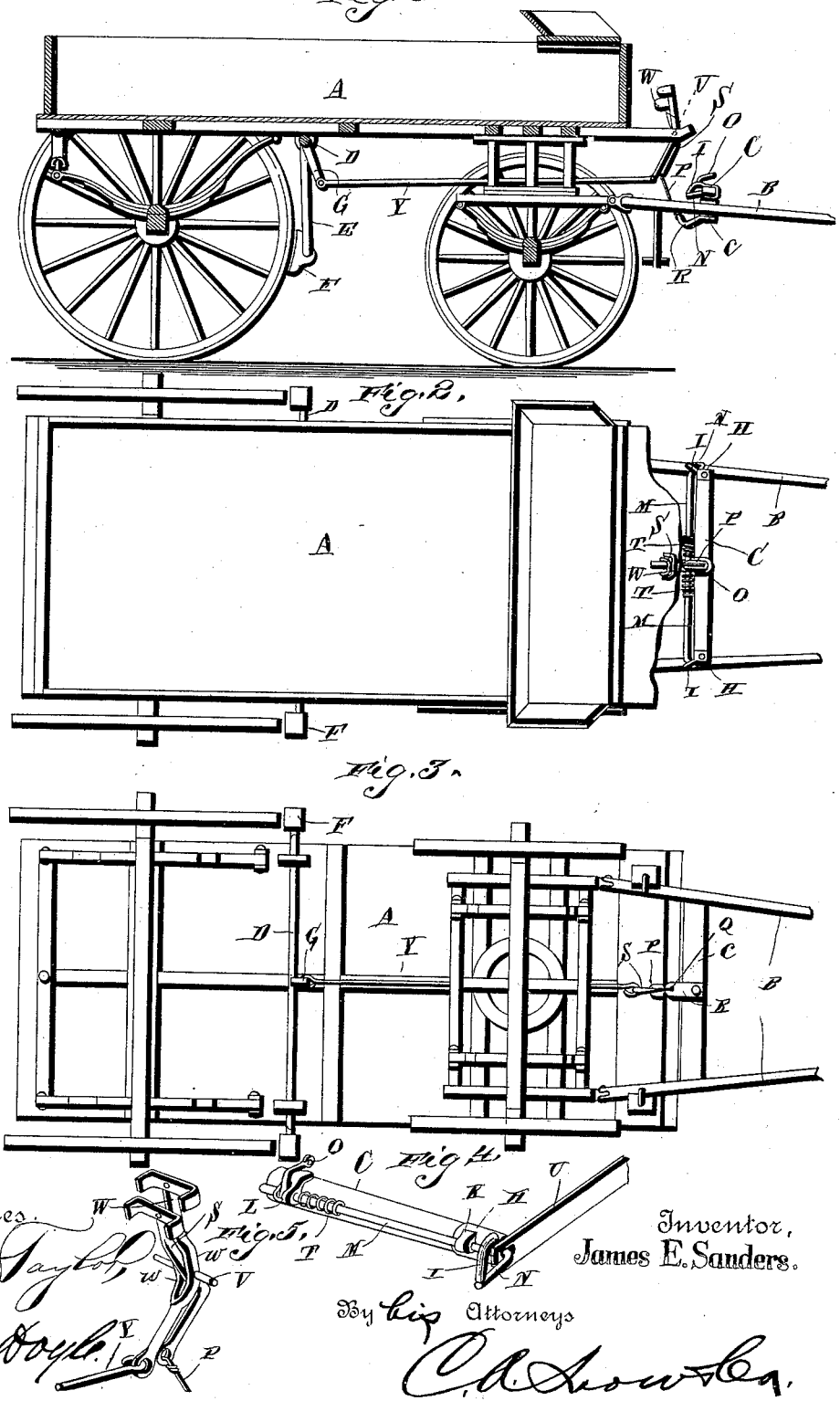

JAMES EWINGS SANDERS, OF UNION CITY, TENNESSEE.

HORSE-DETACHER AND WAGON-BRAKE.

SPECIFICATION forming part of Letters Patent No. 391,920, dated October 30, 1888.

Application filed May 8, 1888. Serial No. 273,209. (No model.)

*To all whom it may concern:*

Be it known that I, JAMES EWINGS SANDERS, a citizen of the United States, residing at Union City, in the county of Obion and State of Tennessee, have invented a new and useful Improvement in Horse-Detachers and Wagon-Brakes, of which the following is a specification.

My invention relates to a horse-detacher and wagon-brake combined for simultaneous operation, whereby when the horse is detached the motion of the vehicle is stopped; and it has for its object to provide a simple, cheap, easily applied, and effective device to enable the traces to be simultaneously and instantly released. Furthermore, to provide means whereby when the horse is detached the shafts or thills will be supported above the ground to prevent them from being broken before the motion of the vehicle is stopped; and, furthermore, to provide simple means for connecting the brake-operating means to the detaching means, whereby they may be simultaneously applied.

With these objects in view the invention consists in a certain novel construction and arrangement of devices fully set forth hereinafter, in connection with the accompanying drawings, wherein—

Figure 1 is a side view of a vehicle, showing the improved detacher applied thereto and connected to the brake. Fig. 2 is a plan view of the same. Fig. 3 is a bottom plan view. Fig. 4 is a detail view of one of the thimbles and attachments, such as are applied to the ends of the whiffletree. Fig. 5 is a detail view of the foot-levers.

Referring to the drawings, A designates the body of the vehicle, to which the thills B B are attached in any ordinary or preferred manner.

C represents the whiffletree, which is mounted in the usual manner on the cross-bar $c$ between the thills, and D represents a transverse shaft, which is mounted under the body of the vehicle and is provided with the crank-arms E, having brake-shoes F on their ends, and depending arm G, the function of which will be hereinafter explained.

H H represent thimbles, which are fitted on the ends of the whiffletree, and they are provided with the rearwardly-extending hook-shaped guards I I, beneath which are arranged the bearings K.

A bearing, L, is arranged on the rear side of the whiffletree at its center, and it is aligned with the bearings K, (which are also on the rear side of the whiffletree,) and M M represent rods, which are mounted at their ends in these bearings, and are provided at their outer ends with hooks N N, which are tapered toward their ends and are adapted to close the spaces between the lower or rear ends of the guards and the thimble. These rods may, if preferred, be made integral and extending the entire length of the whiffletree. The inner or adjacent ends of the rods are connected by the operating-arm O, which is curved slightly forward over the whiffletree, and to the upper end of the arm is attached the cord, strap, or chain P, which passes through a guide-slot, Q, in a bracket, R, which is secured to the under side of the cross-bar $c$ and extends rearwardly and upwardly. The said cord, strap, or chain is attached at its rear end to the lower end of the foot-lever S, the upper end of which projects through the bottom of the body of the vehicle. It will be seen that when the foot-lever is operated the operating-arm is drawn rearwardly, thereby turning the rods M, and the hooks on the outer ends of the latter are swung downwardly and forwardly at their rear ends, as and for a purpose hereinafter more fully explained.

The coiled springs T T, which are mounted on the rods M, normally hold the hooks N in an approximately horizontal position, with their rear ends bearing against the ends of the guards I I, so that when the rear ends of the traces U U are engaged on the hooks they cannot become detached. When the driver operates the foot-lever, the rods M are turned in opposition to the strength of the springs, and the hooks are consequently turned until the traces slip freely therefrom. The operating-arm serves as a handle to turn the trace-hooks when the horse is being attached to the vehicle.

The foot-lever above mentioned is mounted on a transverse pivot, V, and W represents a foot-lever, which is provided with parallel sides $w$ $w$, mounted on the said pivot on the opposite sides of the lever S, and the lever W is connected at its lower end to the lower end of the depending arm G by the connecting-rod Y.

It will be seen that the lever W may be operated separately to apply the brakes; but when the lever S is operated its lower end bears against the lower end of the lever W and operates the latter at the same time.

The rods M, as will be understood, are arranged in rear of the whiffletree, where they are out of sight and out of the way of the horse and driver, and they serve, further, to strengthen the whiffletree when strained by the draft of the horse. It will be seen further that the cord, strap, or chain passes directly from the bracket to the lever, and as it is taut the thills are upheld thereby and prevented from coming in contact with the ground at their free ends. The advantage of this arrangement will be seen. Ordinarily, horse-detachers are either so constructed that when the horse is released the thills drop to the ground and are broken before the vehicle can be stopped, and thereby endangering the lives of the occupants of the vehicle and ruining the latter, or they are so constructed that the thills are released with the horse, thereby endangering the life or limbs of the latter. It will be seen that neither of these objections can be urged with respect to the herein-described improved detacher, for the reason that the thills are allowed to remain on the vehicle and are upheld, so as not to be broken by contact with the ground.

Having thus described the invention, I claim—

1. The combination of the rods M, mounted on the whiffletree of a vehicle and having hooks on their outer ends, the operating-arm connecting the inner ends of the said rods, the spring mounted on the rods, as specified, the guide-bracket, the foot-lever mounted in the body of the vehicle, and the cord, strap, or chain connecting the upper end of the operating-arm with the foot-lever and passing through the said bracket, all constructed and arranged substantially as and for the purpose specified.

2. The combination, with the spring-actuated trace-hooks mounted on the ends of the whiffletree of a vehicle, the operating-arm, and the strap, cord, or chain attached to the arm and adapted when pulled to operate the said hooks, of the transverse shaft mounted on the vehicle and having the brake-shoes connected to its ends, and the depending arm G, the foot-lever W, connected at its lower end to the arm G, and the foot-lever S, mounted within the lever W, and having the end of the strap, cord, or chain attached thereto all constructed, arranged, and operated substantially as and for the purpose specified.

In testimony that I claim the foregoing as my own I have hereto affixed my signature in presence of two witnesses.

JAMES EWINGS SANDERS.

Witnesses:
  FLOYD WRIGHT,
  J. C. PIERSON.